United States Patent
Yoo et al.

(10) Patent No.: US 9,670,933 B2
(45) Date of Patent: Jun. 6, 2017

(54) APPARATUS AND METHOD FOR CONTROLLING COMPRESSOR, AND REFRIGERATOR HAVING THE SAME

(71) Applicant: LG ELECTRONICS INC., Seoul (KR)

(72) Inventors: Jaeyoo Yoo, Seoul (KR); Gyunam Kim, Seoul (KR); Boram Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 782 days.

(21) Appl. No.: 13/752,591

(22) Filed: Jan. 29, 2013

(65) Prior Publication Data

US 2013/0195678 A1 Aug. 1, 2013

(30) Foreign Application Priority Data

Jan. 30, 2012 (KR) ........................ 10-2012-0009083

(51) Int. Cl.
*F04D 27/00* (2006.01)
*F25B 1/02* (2006.01)
(Continued)

(52) U.S. Cl.
CPC .......... *F04D 27/005* (2013.01); *F04B 35/045* (2013.01); *F04B 49/02* (2013.01);
(Continued)

(58) Field of Classification Search
CPC .......... F04B 17/03; F04B 17/04; F04B 23/04; F04B 23/06; F04B 35/045; F04B 49/965;
(Continued)

(56) References Cited

U.S. PATENT DOCUMENTS 3,244,965 A * 4/1966 Gutzwiller ................ 323/324
3,360,958 A * 1/1968 Miner ................... F25B 31/002
62/470

(Continued)

FOREIGN PATENT DOCUMENTS

CN 1432736 A 7/2003
CN 1886628 A 12/2006
(Continued)

OTHER PUBLICATIONS

Purdue University, Purdue e-Pubs, International Compressor Engineering Conference, 2004, Capacity Modulation of Linear Compressor for Household Refrigerator, Heo, Lee, Song and Jung.*

(Continued)

*Primary Examiner* — Theodore Stigell
*Assistant Examiner* — Jon Hoffmann
(74) *Attorney, Agent, or Firm* — KED & Associates, LLP (57) ABSTRACT

A compressor control apparatus, and a refrigerator including the same are provided. The operation of two compressors may be controlled using an alternating current (AC) switch, thereby minimizing a number of components, as well as increasing compressor capacity and enhancing operation efficiency. A plurality of operation modes may be used to correspond to a load or freezing capacity using two compressors, and the two compressors may be operated in a separate or simultaneous manner using a drive including two (AC) switches, thereby simplifying the configuration of the system.

5 Claims, 6 Drawing Sheets

(51) Int. Cl.
*F25B 5/02* (2006.01)
*F25B 49/02* (2006.01)
*F04B 35/04* (2006.01)
*F04B 49/02* (2006.01)
*F04B 49/06* (2006.01)
*F04D 27/02* (2006.01)
*F25B 1/10* (2006.01)

(52) U.S. Cl.
CPC .......... *F04B 49/06* (2013.01); *F04D 27/0269* (2013.01); *F25B 1/02* (2013.01); *F25B 5/02* (2013.01); *F25B 49/022* (2013.01); *F04B 2203/0201* (2013.01); *F04B 2203/0202* (2013.01); *F04B 2203/0208* (2013.01); *F25B 1/10* (2013.01); *F25B 2341/0661* (2013.01); *F25B 2400/075* (2013.01); *F25B 2500/19* (2013.01); *F25B 2500/26* (2013.01); *F25B 2600/021* (2013.01); *F25B 2600/024* (2013.01); *F25B 2600/23* (2013.01); *F25B 2700/151* (2013.01); *Y02B 30/741* (2013.01)

(58) Field of Classification Search
CPC .......... F04B 49/02; F04B 49/12; F04B 49/20; F04B 49/007; F04B 2203/0408; F04B 2207/01; F04B 2207/03; F04B 41/06; F04B 35/04; F04B 49/06; F04B 2207/045; F04B 2203/0404; F04B 2203/0204; F04B 2203/0402; F04B 2203/0401; F04B 2201/0206; F04D 15/02; F04D 15/0245; F04D 15/029; F04D 27/004; F04D 27/005; F04C 23/008; F04C 14/02; F04C 28/02; F04C 14/06; F04C 14/065; F04C 28/06; F04C 28/065; F04C 2270/01; F04C 2270/015; F04C 2270/07; F04C 2270/075; F04C 2270/09; F04C 2270/095; F04C 2270/10; F04C 2270/105; F04C 2240/401; F04C 2240/403; F04C 2240/808; F25B 7/00; F25B 1/00; F25B 1/10; F25B 49/00; F25B 49/022; F25B 5/02; F25B 1/02; F25B 2600/02; F25B 2600/23; F25B 2600/021; F25B 2700/151; F25B 2500/26; F25B 2400/07; F25B 2400/073; F25B 2341/0661; H02P 1/00; H02P 6/08
USPC .... 417/3–8, 416, 418, 902, 426; 363/40, 44, 363/48, 52, 55, 57, 71, 81, 95, 108, 109, 363/118, 120, 124, 131, 174, 175; 318/800, 801, 805, 722, 400.01, 700, 318/400.14, 400.15, 721, 727, 799
See application file for complete search history.

(56) References Cited

U.S. PATENT DOCUMENTS

| | | | | |
|---|---|---|---|---|
| 4,179,899 | A * | 12/1979 | Katayama | F04B 49/10 318/473 |
| 4,283,920 | A * | 8/1981 | Kainuma | F25B 49/022 318/473 |
| 4,810,943 | A * | 3/1989 | Kawaguchi | F25B 49/025 318/375 |
| 5,066,197 | A * | 11/1991 | Champagne | 417/18 |
| 6,382,256 | B2 * | 5/2002 | Kim | F16K 11/048 137/870 |
| 2002/0026801 | A1 * | 3/2002 | Yamashita | F04B 35/04 62/181 |
| 2002/0064463 | A1 * | 5/2002 | Park | F04B 35/045 417/44.1 |
| 2003/0133807 | A1 * | 7/2003 | Heo | 417/44.11 |
| 2003/0177773 | A1 * | 9/2003 | Kim | 62/156 |
| 2003/0182956 | A1 * | 10/2003 | Kurita et al. | 62/228.1 |
| 2006/0108969 | A1 * | 5/2006 | Han et al. | 318/807 |
| 2006/0127225 | A1 * | 6/2006 | Kim | F04B 35/045 417/44.1 |
| 2007/0140867 | A1 * | 6/2007 | Bae et al. | 417/44.1 |
| 2007/0217236 | A1 * | 9/2007 | Lim | H02M 1/4208 363/89 |
| 2007/0283707 | A1 * | 12/2007 | Hatano et al. | 62/230 |
| 2008/0053120 | A1 * | 3/2008 | Nakai | F25B 13/00 62/157 |
| 2008/0150456 | A1 * | 6/2008 | Heo et al. | 318/119 |
| 2009/0160247 | A1 * | 6/2009 | Nakamura et al. | 307/9.1 |
| 2009/0320507 | A1 * | 12/2009 | Saruwatari | F24F 11/0086 62/234 |
| 2011/0005097 | A1 | 1/2011 | Moon et al. | |
| 2011/0247358 | A1 * | 10/2011 | Wada | F25B 1/10 62/510 |

FOREIGN PATENT DOCUMENTS

| | | |
|---|---|---|
| CN | 1906451 A | 1/2007 |
| CN | 101071012 A | 11/2007 |
| CN | 100588840 C | 2/2010 |
| CN | 101663433 A | 3/2010 |
| CN | 101939479 A | 1/2011 |
| CN | 102112678 A | 6/2011 |
| JP | 2000130824 A | 5/2000 |

OTHER PUBLICATIONS

Chinese Office Action issued in application No. 201310035381.2 dated Nov. 3, 2014.
European Search Report dated Nov. 27, 2013 for corresponding Application No. 13153066.9.
Chinese Office Action issued in Application No. 201310035381.2 dated May 6, 2015.

* cited by examiner

APPARATUS AND METHOD FOR CONTROLLING COMPRESSOR, AND REFRIGERATOR HAVING THE SAME

CROSS-REFERENCE TO RELATED APPLICATION(S)

This application claims priority under 35 U.S.C. §119 to Korean Application No. 10-2012-0009083, filed on Jan. 30, 2012, whose entire disclosure is hereby incorporated by reference.

BACKGROUND

1. Field

This relates to a compressor control apparatus and a refrigerator comprising the same.

2. Background

In general, compressors convert mechanical energy into compression energy of a fluid and may form part of a refrigerating cycle used in an appliance, such as, for example, a refrigerator, an air conditioner or the like. Compressors may be classified into reciprocating compressors, rotary compressors, and scroll compressors. Reciprocating compressors form a compression space between a piston and a cylinder to suction or discharge a working gas, thereby compressing refrigerant while moving in a linear reciprocating manner. Rotary compressors form a compression space between an eccentrically rotated roller and a cylinder to suction or discharge a working gas, thereby compressing refrigerant while the roller is eccentrically rotated along an inner wall of the cylinder. Scroll compressors form a compression space between an orbiting scroll and a fixed scroll to suction or discharge a working gas, thereby compressing refrigerant while the orbiting scroll is rotated along the fixed scroll.

BRIEF DESCRIPTION OF THE DRAWINGS

The embodiments will be described in detail with reference to the following drawings in which like reference numerals refer to like elements wherein.

DETAILED DESCRIPTION

In reciprocating compressors, an inner piston may move in a linear reciprocating manner within the cylinder, thereby suctioning, compressing and discharging a refrigerant gas. In a recipro-type reciprocating compressor, a crank shaft may be coupled to a rotating motor and a piston may be coupled to the crank shaft, thereby converting a rotational movement into a linear reciprocating movement. In a linear-type reciprocating compressor, a piston may be connected to a linearly moving mover of the motor, thereby converting a linear movement of the motor into a reciprocating movement of the piston.

Reciprocating compressors may include a power unit for generating a driving force, and a compression unit for receiving the driving force from the power unit to compress a fluid. For example, an electric motor may be used for the electric power unit, and a linear motor may be used in a linear type reciprocating compressor. In a linear motor, the motor may directly generate a linear driving force, without the use of an additional mechanical conversion device, resulting in a less complicated structure. Furthermore, a linear motor may reduce loss due to energy conversion, and, without a connecting portion causing friction and abrasion, noise may be reduced. Furthermore, when a linear type reciprocating compressor (hereinafter, referred to as a "linear compressor") is used in, for example, a refrigerator or air conditioner, a stroke voltage applied to the linear compressor may be changed to change the compression ratio, thereby allowing the linear compressor to provide for variable freezing capacity control.

However, since a linear compressor may perform a reciprocating movement while the piston is not mechanically restricted in the cylinder, the piston may collide with the cylinder wall, or forward movement of the piston may be restricted due to a large load when voltage is suddenly and excessively applied, thereby causing difficulty in performing proper compression. Accordingly, a control apparatus for controlling movement of the piston corresponding to variation of a load or voltage may be considered.

Figure 1:
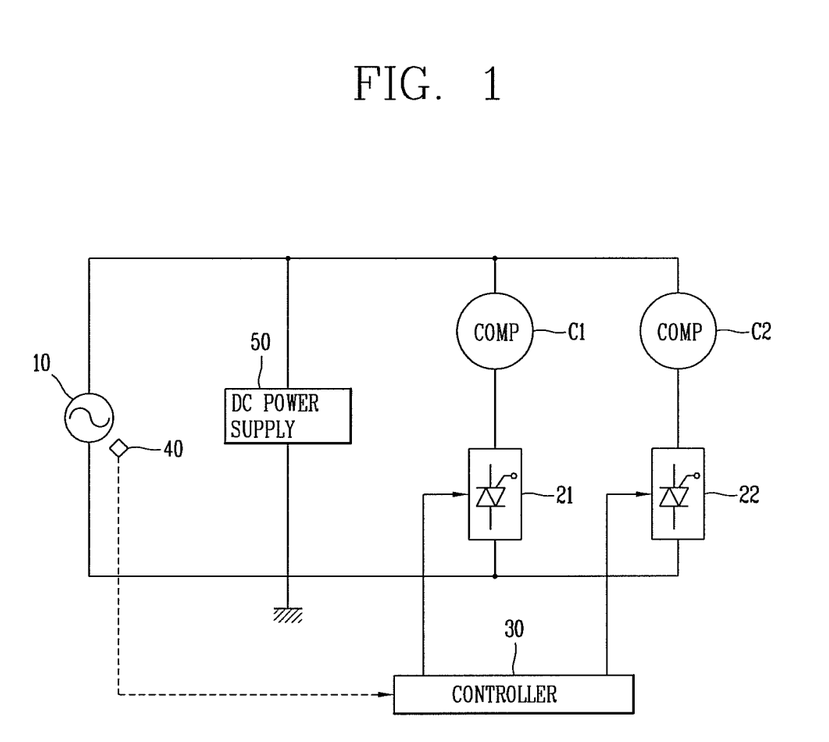
FIGS. 1 and 2 are schematic views of a compressor control apparatus according to embodiments as broadly described herein.

A compressor control apparatus may detect voltage and current applied to the compressor motor and estimate a stroke using, for example, a sensorless method, to perform feedback control, and, may include, for example, a triac or inverter for controlling the compressor. Referring to FIG. 1, a compressor control apparatus as embodied and broadly described herein may include a first alternating current (AC) switch 21 and a second AC switch 22 switched based on a first control signal and a second control signal to drive a first compressor C1 and a second compressor C2, and a controller 30 configured to generate a first control signal and a second control signal based on a load of the first compressor C1 and the second compressor C2 to output them to the first and second alternating current switches 21, 22. The compressor control apparatus may operate the first and second compressors C1, C2 in a simultaneous manner, or may operate only the first compressor C1 or only the second compressor C2, in a separate manner.

The first and second alternating current (AC) switches 21, 22 are opened or closed to apply the motor drive voltage and motor drive current to compressor motors provided in the first and second compressors C1, C2. The alternating current (AC) switches 21, 22 may include a thyrister, a triac, or the like. The controller 30 may vary a firing angle of the first alternating current switch 21 or second alternating current switch 22 based on the freezing capacity of the first compressor C1 and second compressor C2.

Figure 3A:
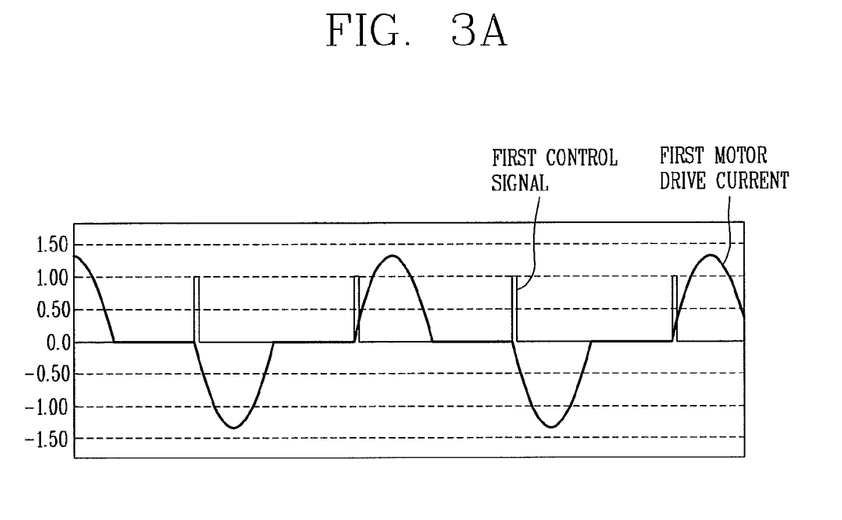
FIGS. 3A and 3B are graphs of a control operation of two compressors.
Figure 3B:
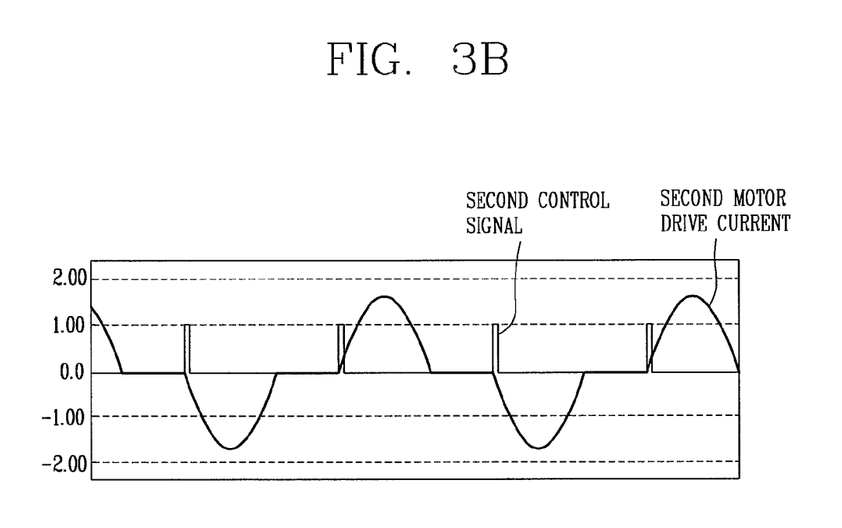

FIGS. 3A and 3B illustrate a method of varying a firing angle of the triac to control the freezing capacity of the compressor when the triac is used for the alternating current switch. Referring to FIG. 3A, when a gate voltage is received at the first alternating current switch 21 based on the first control signal, the first alternating current switch 21 supplies a first motor drive current to the first compressor C1. Similarly, referring to FIG. 3B, when a gate voltage is received at the second alternating current switch 22 based on the second control signal, the second alternating current switch 22 supplies a second motor drive current to the second compressor C2. At this time, the controller 30 may generate first and second signals for varying a firing angle of the first and second alternating current switches 21, 22 to perform a load corresponding operation.

Referring to FIG. 1 again, the compressor control apparatus may also include a power voltage detector 40 configured to detect the power voltage of the commercial alternating current (AC) power 10. The compressor control apparatus may also include a zero voltage detector configured to detect the zero voltage of the power voltage, and a power frequency detector configured to detect the power frequency of the commercial alternating current (AC) power 10.

Furthermore, the compressor control apparatus may also include a direct current (DC) power supply 50 configured to convert the commercial alternating current power 10 into direct current power to apply it to the first and second alternating current switches 21, 22. The direct current (DC) power supply 50 is a switching mode power supply (SMPS) for receiving commercial alternating current power and performing AC-DC conversion, and supplies drive voltages (for example, 5, 15 V) for the elements of the controller 30, the first and second alternating current switches 21, 22, and the like. In other words, direct current voltages required for the two alternating current switches and two compressors may be supplied using one SMPS.

In certain embodiments, at least one of the first compressor C1 or the second compressor C2 may be a reciprocating compressor, particularly, a linear compressor. Furthermore, the two compressors C1, C2 may have different capacities. The first and second compressors C1, C2 may be operated in a simultaneous manner or operated in a separate manner, respectively, by a compressor control apparatus using two alternating current switches 21, 22. A compressor operation mode may be determined by a load or required freezing capacity of the first and second compressors C1, C2. The compressor operation mode may be an operation mode for controlling the stroke, frequency or the like of each compressor by dividing it into a predetermined value. For example, the compressor operation mode may be a separate operation mode of the first compressor, a separate operation mode of the second compressor, and a simultaneous operation mode of the first and second compressor.

Figure 6:
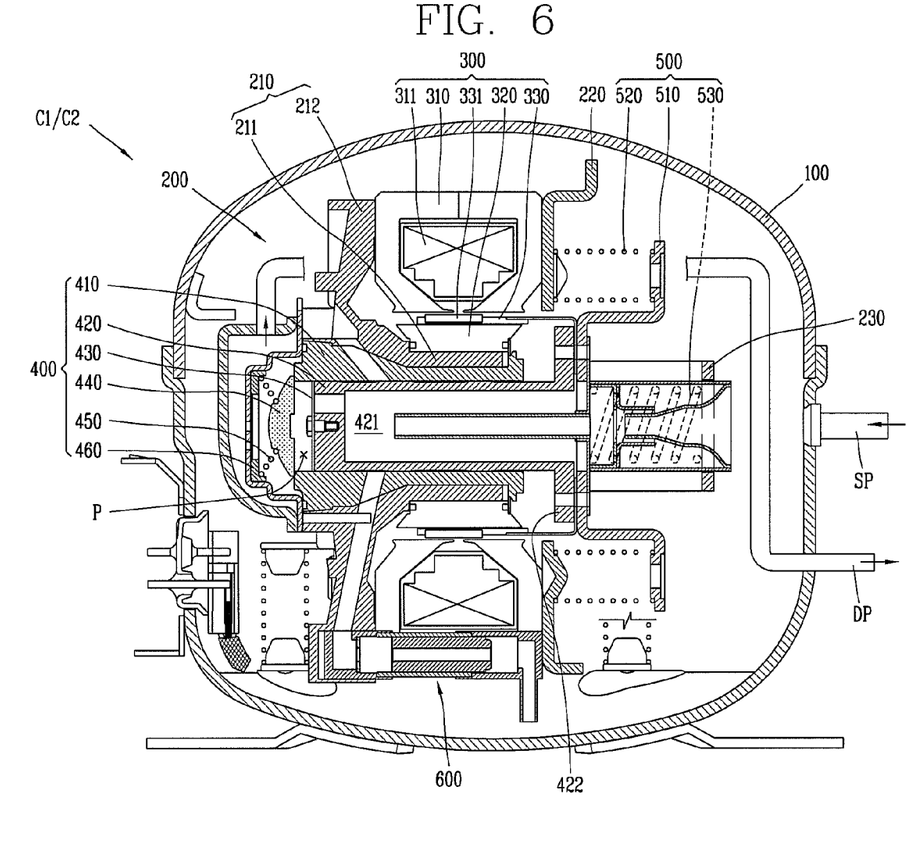
FIG. 6 is a cross-sectional view of an exemplary reciprocating compressor having a compressor control apparatus as embodied and broadly described herein.

Referring to FIG. 12, each of the first compressor and the second compressor may include a casing 100 in communication with a gas suction pipe (SP) and a gas discharge pipe (DP), a frame 200 elastically supported by an inner portion of the casing 100, a motor 300 supported by the frame 200 to allow a mover 330 to perform a linear reciprocating movement, a compression unit 400 in which a piston 420 is coupled to the mover 330 of the motor 300 and supported by the frame 200, and a plurality of resonant units 500 for elastically supporting the mover 330 of the motor 300 and the piston 420 of the compression unit 400 in the movement direction to induce a resonant movement.

The frame 200 may include a first frame 210 supporting the compression unit 400 and a front side of the motor 300, a second frame 220 coupled to the first frame 210 to support a rear side of the motor 300, and a third frame 230 coupled to the second frame 220 to support a plurality of second resonant springs 530. The first frame 210, second frame 220, and third frame 230 may be all formed of a non-magnetic, such as aluminum, to reduce core loss.

The first frame 210 may include a frame portion 211 having an annular plate shape, and a cylinder portion 212 having a cylindrical shape into which a cylinder 410 is inserted, formed on a rear surface, namely, lengthwise as an integral body in the motor direction, at the center of the frame portion 211. The frame portion 211 may be formed such that the outer diameter of the frame portion 211 is greater than or equal to the inner diameter of an outer stator 310 of the motor 300 to support both an outer stator 310 and an inner stator 320 of the motor 300.

The first frame 210 may be fixed such that the inner stator 320 is inserted into an outer circumferential surface of the cylinder portion 212. In this case, the first frame 210 may be formed of a non-magnetic material, such as aluminum, to reduce magnetic loss. Furthermore, the cylinder portion 212 may be formed on the cylinder 410 as an integral body using an insert die casting method. In certain embodiments, the cylinder portion 212 may be screw-assembled such that the cylinder 410 is pressurized or a screw thread is formed at an inner circumferential surface thereof. Furthermore, to improve stability of the cylinder 410, a step surface or inclined surface may be formed between a front side inner circumferential surface and a rear side inner circumferential surface of the cylinder portion 212, thereby allowing the cylinder 410 coupled to an inner circumferential surface of the cylinder portion 212 to be supported in the piston direction.

The motor 300 may include the outer stator 310 supported between the first frame 210 and second frame 220, a coil 311, the inner stator 320 coupled to an inner side of the outer stator 310 at a predetermined interval and inserted into the cylinder portion 212, and the mover 330 in which a magnet 331 is provided to correspond to the coil 311 of the outer stator 310 to perform a linear reciprocating movement along the magnetic flux direction between the outer stator 310 and inner stator 320. The outer stator 310 and inner stator 320 may be formed by laminating a plurality of thin stator core sheets in a cylindrical shape for each sheet or laminating a plurality of thin stator core sheets in a block shape and laminating the stator block in a radial shape.

The compression unit 400 may include the cylinder 410 formed on the first frame 210 as an integral body, the piston 420 coupled to the mover 330 of the motor 300 to perform a reciprocating movement in the compression space P of the cylinder 410, a suction valve 430 mounted at a front end of the piston 420 to control the suction of refrigerant gas while opening or closing a suction passage 421 of the piston 420, a discharge valve 440 mounted at a discharge side of the cylinder 410 to control the suction of the compression gas while opening or closing the compression space P of the cylinder 410, a valve spring 450 elastically supporting the discharge valve 440, and a discharge cover 460 fixed to the first frame 210 at a discharge side of the cylinder 410 to accommodate the discharge valve 440 and valve spring 450.

The cylinder 410 may be formed in a cylindrical shape and may be inserted into and coupled to the cylinder portion 212 of the first frame 210.

The cylinder 410 may be formed of a material having a hardness greater than that of, for example, cast iron, or at least that of the first frame 210, in particular, that of the cylinder portion 212 taking into consideration abrasion due to forming a bearing surface with the piston 420 an inner circumferential surface which may be made of cast iron.

The piston 420 may be formed of the same material as the cylinder 410, or may be formed of a material having a hardness similar to that of the cylinder 410 to reduce abrasion due to contact with the cylinder 410. Furthermore, the suction passage 421 may penetrate into the piston 420 such that refrigerant is drawn into the compression chamber P of the cylinder 410.

The resonant unit 500 may include a spring supporter 510 coupled to a connecting portion between the mover 330 and the piston 420, first resonant springs 520 supported at a front side of the spring supporter 510, and second resonant springs 530 supported at a rear side of the spring supporter 510.

The compressor may also include a piston connecting portion 422 and an oil feeder 600.

When power is applied to the motor 300 and a magnetic flux is formed between the outer stator 310 and inner stator 320, the mover 330 positioned at a gap between the outer stator 310 and inner stator 320 continuously performs a reciprocating movement due to the resonant unit 500 while moving along the direction of the magnetic flux. When the piston 420 performs a backward movement within the cylinder 410, refrigerant filled in an inner space of the casing 100 passes through the suction passage 421 of the piston 420 and the suction valve 430 and is drawn into the compression space P of the cylinder 410. When the piston 420 performs a forward movement within the cylinder 410, refrigerant gas drawn into the compression space P is compressed to repeat a series of discharge processes while opening the discharge valve 440.

Such a reciprocating compressor may be used in various different types of appliance, such as, for example, a refrigerator or air conditioner. When the first and second compressors are applied to a refrigerator as illustrated in FIG. 5, it may be designed such that one compressor takes charge of the refrigerating chamber and the other compressor takes charge of freezing chamber.

Figure 5:
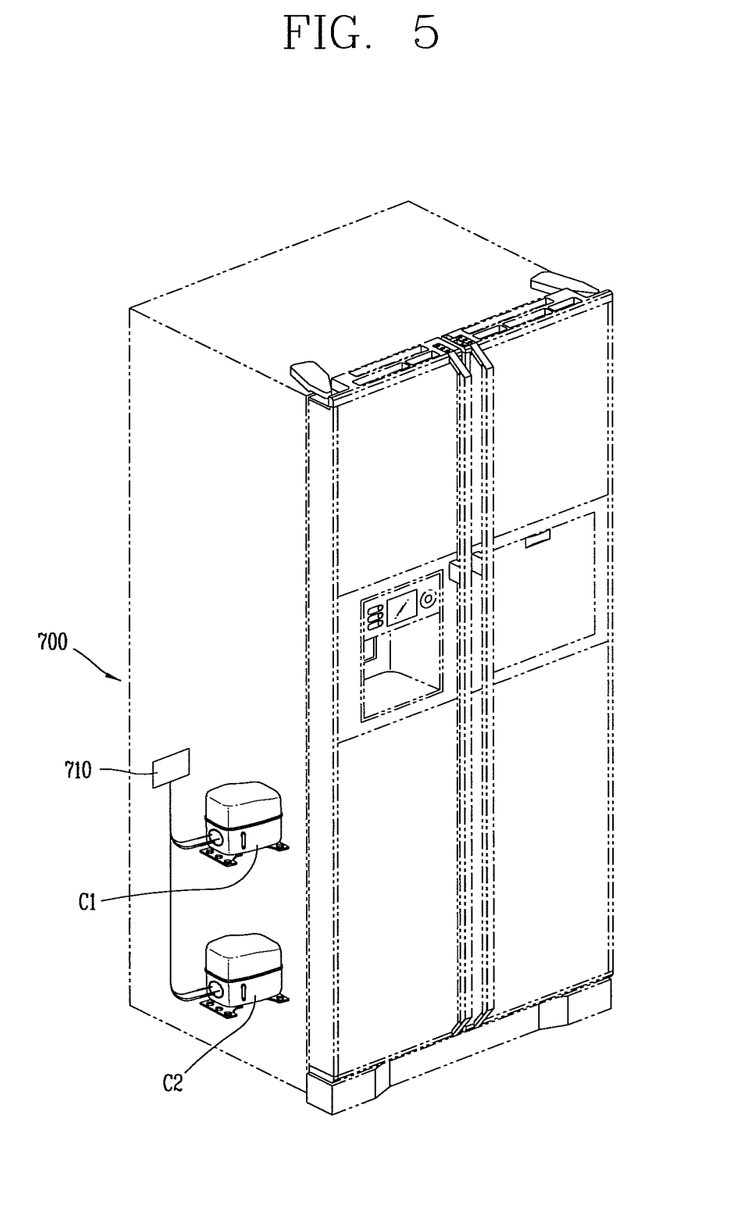
FIG. 5 is a perspective view of a refrigerator having two compressors.

Referring to FIGS. 1 and 5, a refrigerator as embodied and broadly described herein may include a refrigerator body, a first compressor C1 and a second compressor C2 provided in the refrigerator body to compress refrigerant, first and second alternating current switches 21, 22 switched based on first and second control signals to drive the first and second compressors C1, C2, and a controller 30 configured to generate the first and second control signals based on a load of the first and second compressors C1, C2 and output them to the first and second alternating current switches 21, 22, wherein the first and second compressors C1, C2 are operated in a simultaneous manner, or the first compressor C1 or the second compressor C2 is operated in a separate manner.

Referring to FIG. 5, the refrigerator 700 is provided with a main board 710 therein for controlling overall operation of the refrigerator, and connected to the first and second compressors C1, C2. The compressor control apparatus may be provided in the main board 710. The refrigerator 700 is operated by driving the first and second compressors C1, C2. Cool air supplied to an inner portion of the refrigerator is generated by heat exchange with refrigerant, and continuously supplied to an inner portion of the refrigerator while repeatedly performing compression-condensation-expansion-evaporation cycles. The supplied refrigerant is uniformly transferred to an inner portion of the refrigerator by convection, thereby allowing items within the refrigerator to be stored at a desired temperature.

The compressor control apparatus may also include first and second load detectors 61, 62 configured to detect a load of the first and second compressors C1, C2. The controller 30 generates first and second control signals based on the load of the first and second compressors C1, C2 to operate the first and second compressors C1, C2 in a separate or simultaneous manner. The controller 30 generates the first and second control signals using a first and second stroke of the first and second compressors C1, C2, and stroke instruction values for the first and second compressors C1, C2. Here, the load of the compressor may include a motor current, a motor voltage, a stroke, their phase difference, a frequency, and the like. For example, when a compressor is provided in a refrigerator, the load of the compressor may be detected using a load of the refrigerator.

Figure 2:
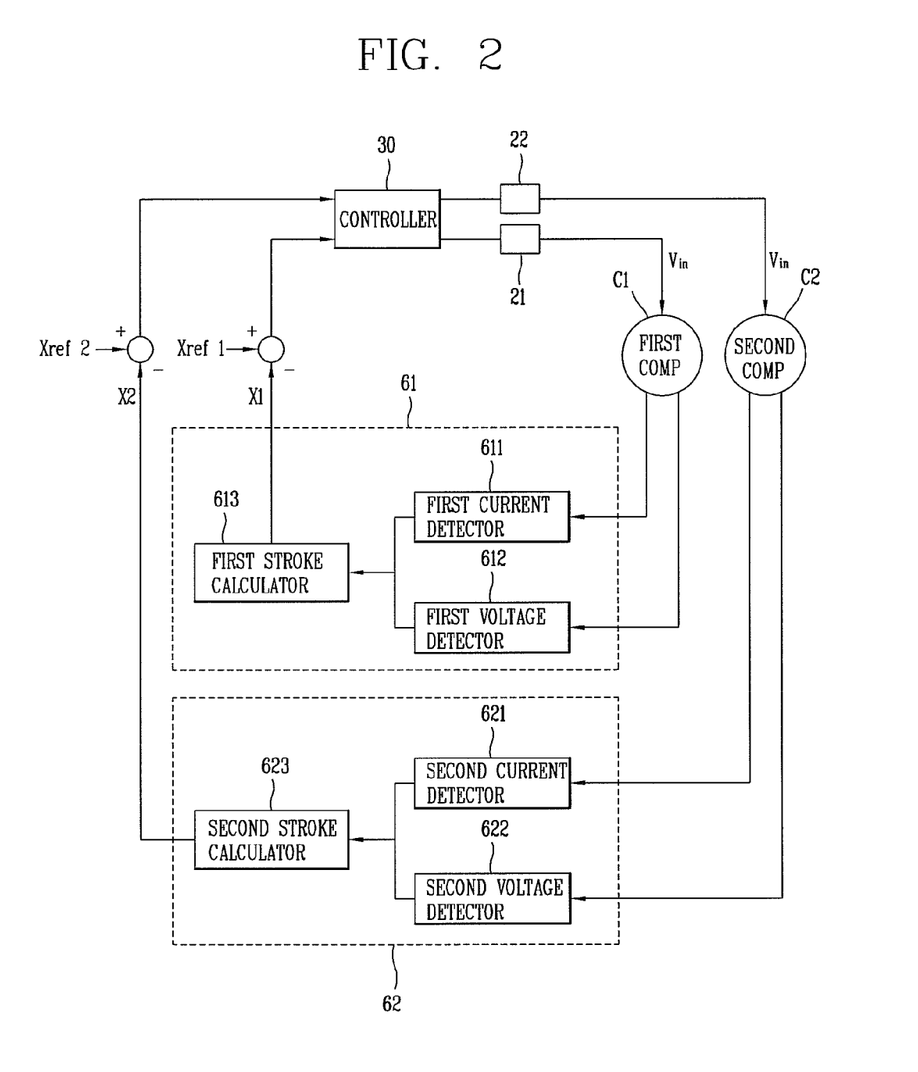

Referring to FIG. 2, the compressor control apparatus may include a first current detector 611 configured to detect a first motor drive current applied to a first motor provided in the first compressor C1 and a first voltage detector 612 configured to detect a first motor drive voltage applied to the first motor. The compressor control apparatus may further include a second current detector 621 configured to detect a second motor drive current applied to a second motor provided in the second compressor C2 and a second voltage detector 622 configured to detect a second motor drive voltage applied to the second motor.

The first and second current detectors 611, 621 detect a drive current applied to the compressor based on a load of the compressor or a load of the freezer. The current detectors 611, 621 detect a motor current applied to the compressor motor. The first and second voltage detectors 612, 622 detect a motor voltage applied to the compressor. The voltage detectors detect a motor voltage applied between both ends of the compressor motor based on a load of the compressor.

The compressor control apparatus according to embodiments as broadly described herein may also include a first stroke calculator 613 and a second stroke calculator 623 configured to calculate a first and second stroke of the first and second compressor, respectively, using the motor drive current and the motor drive voltage. The relationship among the motor voltage, motor current, and stroke is as follows. The first and second stroke calculators 613, 623 may calculate a stroke using the following equation based on a motor voltage detected through the first and second voltage detectors 612, 622, and a motor current detected through the first and second current detectors 611, 621.

$$x = \frac{1}{\alpha} \int \left( Vin - Ri - L\frac{di}{dt} \right) dt \qquad \text{Equation 1}$$

In Equation 1, x is a stroke, α is a motor constant, Vm is a motor voltage, R is a resistance, L is an inductance, and i is a motor current.

The controller 30 receives a first stroke instruction value (xref1) and compares a first stroke estimate value (x1) calculated by the first stroke calculator 613 with the first stroke instruction value (xref1). The controller 30 compares the first stroke estimate value (x1) with the first stroke instruction value (xref1), and generates a first control signal for switching the first alternating current switch 21 based on the comparison result. In addition, the controller 30 receives a second stroke instruction value (xref2) and compares a second stroke estimate value (x2) calculated by the second stroke calculator 623 with the second stroke instruction value (xref2). The controller compares the second stroke estimate value (x2) with the second stroke instruction value (xref2), and generates a second control signal for controlling the second alternating current switch 22 based on the comparison result. The compressor control apparatus may perform sensorless control, and the detailed description thereof will be omitted.

The first and second load detectors 61, 62 may detect a load on the first compressor C1 and the second compressor C2, respectively, using the motor drive current, the motor drive voltage, or the first and the second stroke. The controller 30 independently operates the first compressor C1 and the second compressor C2 based on the load on the first compressor C1 and the second compressor C2 detected by the first load detector 61 and the second load detector 62.

The size of the compressor load may be detected using a phase difference between the motor current and stroke estimate value, and a phase difference between the motor voltage and stroke estimate value. Furthermore, the size of the compressor load may be detected using a gas spring constant (Kg). In addition, the size of the compressor load may be detected using a gas damping constant (Cg).

Figure 4:
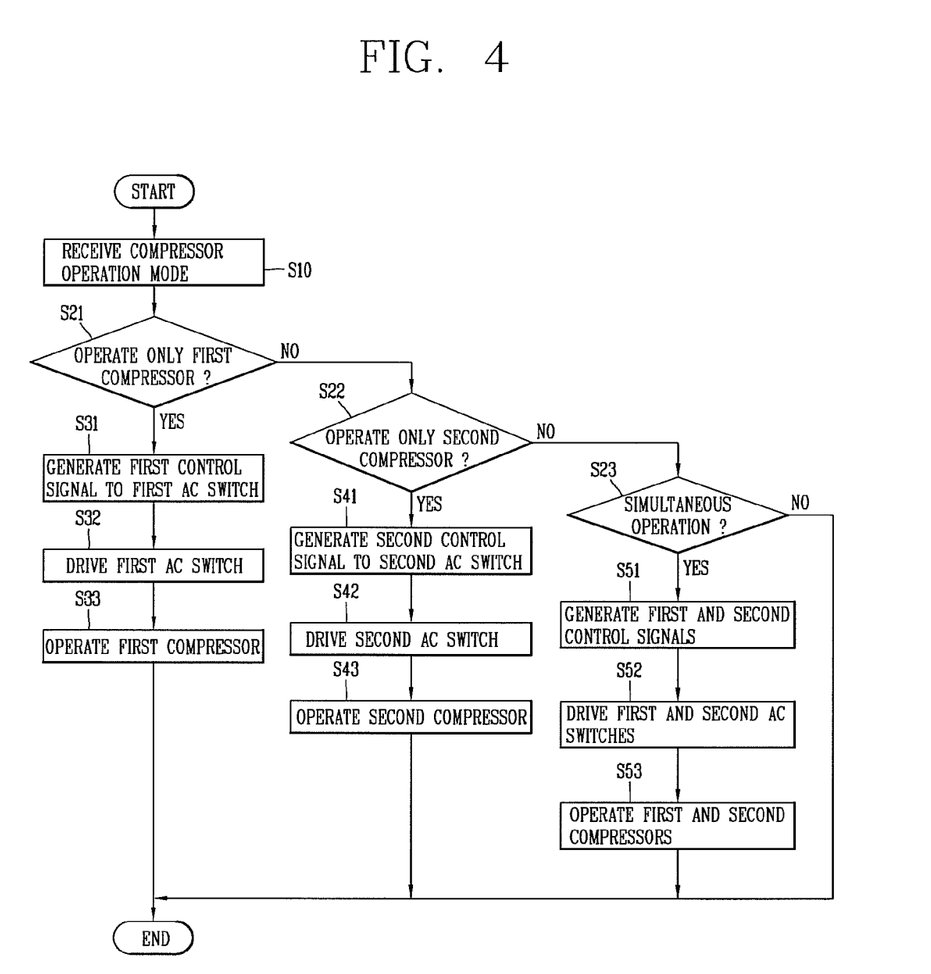
FIG. 4 is a flow chart of a compressor control method according as embodied and broadly described herein.

Referring to FIG. 4, a compressor control method as embodied and broadly described herein may control the first compressor C1 and the second compressor C2 using first and second alternating current (AC) switches 21, 22, respectively. The compressor control method may include receiving a compressor operation mode (S10), and driving the first and second alternating current switches 21, 22 in a simultaneous manner or driving the first alternating current switch 21 or the second alternating current switch 22 in a separate manner based on the compressor operation mode (S21 and subsequent). The compressor operation mode may be determined by a load or required freezing capacity of the first and second compressors C1, C2. The compressor operation mode may control a compression amount or the like of each compressor, including a mode of operating only the first compressor, a mode of operating only the second compressor, and a mode of operating the first and the second compressor in a simultaneous manner. Hereinafter, the configuration of the apparatus refers to FIGS. 1 and 2.

In a driving step shown in FIG. 4 the first and second compressors connected to the driven alternating current switches, are operated in a simultaneous manner (S23, S51, S52, S53), or are operated in a separate manner S21 and S31-S33) (S22 and S41-S43). Here, the operating step varies a firing angle of the first alternating current switch 21 or second alternating current switch 22 based on a freezing capacity of the first compressor C1 or the second compressor C2.

The first and the second alternating current switches 21, 22 are connected to the first and second compressors C1, C2, and then the compressor control apparatus receives a compressor operation mode (S10), and determines whether to operate only the first compressor C1, operate only the second compressor C2, or operate both the first and second compressors C1, C2 in a simultaneous manner (S21, S22, S23).

When operating the first compressor C1, the compressor control apparatus compares a first stroke instruction value (xref1) with a first stroke estimate value (x1), and generates a first control signal for switching the first alternating current switch 21 based on the comparison result (S31). In addition, when operating the second compressor C2, the compressor control apparatus compares a second stroke instruction value (xref2) with a second stroke estimate value (X2), and generates a second control signal for switching the second alternating current switch 22 based on the comparison result (S41). When the first and second compressors C1, C2 are operated in a simultaneous manner, the compressor control apparatus generates the first and second control signals to the first and second alternating current switches 21, 22, respectively (S51).

The compressor control apparatus varies a firing angle of the first alternating current switch 21 or second alternating current switch 22 based on a freezing capacity of the first and second compressors C1, C2, and performs voltage control for the compressor based on this. Referring to FIG. 3A, when a gate voltage is received at the first alternating current switch 21 based on a first control signal, the first alternating current switch 21 supplies a first motor drive current to the first compressor C1. Similarly, referring to FIG. 3B, when a gate voltage is received at the second alternating current switch 22 based on a second control signal, the second alternating current switch 22 supplies a second motor drive current to the second compressor C2.

As described above, in a compressor control apparatus and a refrigerator including the same, as embodied and broadly described herein, operation of two compressors may be controlled using an alternating current (AC) switch, reducing/minimizing a number of components, increasing compressor capacity and enhancing operation efficiency. In a system as embodied and broadly described herein, a plurality of operation modes may be used to correspond to a load or freezing capacity using two compressors. Furthermore, two compressors may be operated in a separate or simultaneous manner using two alternating current (AC) switches, thereby simplifying the configuration of the system to reduce cost.

A compressor control apparatus and method, and a refrigerator implementing the same, are provided that are capable of operating two compressors using an alternating current (AC) switch.

A compressor control apparatus and method, and a refrigerator implementing the same, are provided for detecting current and voltage applied to two compressor motors, respectively, and estimating a stroke of each compressor to control the stroke or frequency of the two compressors, in a separate or simultaneous manner.

A compressor control apparatus as embodied and broadly described herein may include a first and a second alternating current (AC) switch switched based on a first and a second control signal to drive a first and a second compressor, and a control unit configured to generate the first and the second control signal based on a load of the first and the second compressor to output them to the first and the second alternating current switch. Here, the first and the second compressor may be operated in a simultaneous manner, or the first compressor or the second compressor may be operated in a separate manner.

The control unit may vary a firing angle of the first alternating current switch or second alternating current switch based on a freezing capacity of the first compressor or second compressor.

The compressor control apparatus may also include an input voltage detection unit configured to detect the power voltage of commercial alternating current (AC) power. The compressor control apparatus may also include a direct current (DC) power supply unit configured to convert the commercial alternating current power into direct current power to apply it to the first and the second alternating current switch.

A compressor control method for controlling a first compressor and a second compressor using a first and a second alternating current (AC) switch, respectively, as embodied and broadly described herein, may include receiving a compressor operation mode, and driving the first and the second alternating current switch in a simultaneous manner or driving the first alternating current switch or the second alternating current switch in a separate manner based on the compressor operation mode.

A refrigerator according as embodied and broadly described herein may include a refrigerator body, a first and a second compressor provided in the refrigerator body to compress refrigerant, respectively, a first and a second alternating current switch switched based on a first and a second control signal to drive the first and the second compressor, and a control unit configured to generate the first and the second control signal based on a load of the first and the second compressor and output them to the first and the second alternating current switch, wherein the first and the second compressor are operated in a simultaneous manner or the first compressor or the second compressor is operated in a separate manner.

In a system and method as embodied and broadly described herein, the operation of two compressors may be controlled using an alternating current (AC) switch, thereby minimizing a number of components, increasing compressor capacity and enhancing operation efficiency.

In a system and method as embodied and broadly described herein, a plurality of operation modes may be used to correspond to a load or freezing capacity using two compressors. Furthermore, according to the present disclosure, two compressors may be operated in a separate or simultaneous manner using two alternating current (AC) switches, thereby simplifying the configuration of a system and reducing cost.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor control apparatus, comprising
a first alternating current (AC) switch and a second AC switch switched in response to a first control signal and a second control signal to drive a first compressor and a second compressor;
a controller configured to generate the first and second control signals based on a load of the first and second compressors and to output the first and second control signals to the first and second AC switches, wherein the controller is configured to selectively operate the first and second compressors in a simultaneous mode in which the first and second compressors operate together, in a first separate mode in which only the first compressor operates, and in a second separate mode in which only the second compressor operates;
a first current detector and a second current detector configured to detect a first motor drive current and a second motor drive current applied to a first motor and a second motor provided in the first compressor and the second compressor, respectively;
a first voltage detector and a second voltage detector configured to detect a first motor drive voltage and a second motor drive voltage applied to the first and second motors, respectively;
a first stroke calculator and a second stroke calculator configured to calculate a first stroke and second stroke of the first compressor and the second compressor, respectively, using the first and second motor drive currents and the first and second motor drive voltages; and
a direct current (DC) power supply configured to convert the commercial alternating current power into direct current power and to apply the converted power to the controller and the first and second alternating current switches,
wherein the load of the first and second compressors is detected using any one of a phase difference between the first and second motor drive currents and the first stroke and second stroke, a phase difference between the first and second motor drive voltages and the first stroke and second stroke, a gas spring constant, or a gas damping constant.

2. The compressor control apparatus of claim 1, further including:
an input voltage detector to detect a voltage of commercial AC power to be supplied to the first and second AC switches.

3. The compressor control apparatus of claim 1, wherein the first compressor or the second compressor is a reciprocating compressor.

4. A refrigerator, comprising
a main body;
a first compressor and a second compressor provided in the main body;
a first alternating current (AC) switch and a second AC switch being switched in response to a first control signal and a second control signal to drive the first and second compressors, respectively;
a controller configured to generate the first and second control signals based on a load of the first and second compressors and output the first and second control signals to the first and second AC switches, wherein the first and second compressors are operated in a simultaneous mode in which the first and second compressors are operated together, or in a separate mode in which only the first compressor or only the second compressor is operated;
a first current detector and a second current detector configured to detect a first motor drive current and a second motor drive current applied to a first motor and a second motor provided in the first compressor and the second compressor, respectively;
a first voltage detector and a second voltage detector configured to detect a first motor drive voltage and a second motor drive voltage applied to the first and second motors, respectively;
a first stroke calculator and a second stroke calculator configured to calculate a first stroke and second stroke of the first compressor and the second compressor, respectively, using the first and second motor drive currents and the first and second motor drive voltages; and
a direct current (DC) power supply configured to convert the commercial alternating current power into direct current power and to apply the converted power to the controller and the first and second alternating current switches, wherein the load of the first and second compressors is detected using any one of a phase difference between the first and second motor drive currents and the first stroke and second stroke, a phase difference between the first and second motor drive voltages and the first stroke and second stroke, a gas spring constant, or a gas damping constant.

5. The refrigerator of claim 4, further including:

an input voltage detector to detect a voltage of incoming commercial AC power.

* * * * *